United States Patent [19]
Gaenzler et al.

[11] 3,916,011
[45] Oct. 28, 1975

[54] METHOD FOR PREPARING GYLCOL ESTERS

[75] Inventors: Wolfgang Gaenzler, Darmstadt-Eberstadt; Klaus Kabs, Seeheim; Guenter Schroeder, Ober-Ramstadt, all of Germany

[73] Assignee: Rohm GmbH, Darmstadt, Germany

[22] Filed: Dec. 7, 1973

[21] Appl. No.: 422,823

[30] Foreign Application Priority Data
Dec. 13, 1972  Germany............................ 2260822

[52] U.S. Cl. ....... 260/497 R; 260/410.6; 260/468 R; 260/485 G; 260/486 R; 252/433; 252/437; 252/454; 252/463; 252/475
[51] Int. Cl.$^2$ ........................................ C07C 67/05
[58] Field of Search ................................. 260/497 R

[56] References Cited
UNITED STATES PATENTS
3,076,840   2/1963   Brandenburg et al. .......... 260/497 R
3,085,108   4/1963   Stepaneck ....................... 260/497 R
3,492,341   1/1970   Trevillyan ....................... 260/497 R

*Primary Examiner*—Anton H. Sutto
*Assistant Examiner*—Richard D. Kelly
*Attorney, Agent, or Firm*—Curtis, Morris & Safford

[57]   ABSTRACT

An improved method for making glycol monoesters and diesters of a carboxylic acid by the reaction of an olefin and oxygen in the presence of a carboxylic acid and a catalyst, wherein said catalyst is a. a complex formed between a compound of titanium and a compound of lithium, beryllium, magnesium, calcium, boron, aluminum, silicon, or phosphorus, or b. a complex formed between compounds of at least two elements selected from the group consisting of boron, aluminum, silicon, and phosphorus.

6 Claims, No Drawings

METHOD FOR PREPARING GYLCOL ESTERS

The present invention relates to a process for the preparation of glycol esters by the oxidation of an olefin with oxygen and a carboxylic acid in the presence of a catalyst.

It is known in the art to react olefins with molecular oxygen in a carboxylic acid to form the corresponding glycol monoester or diester in the presence of a catalyst. In particular, the use of specific catalysts is the subject of a number of patents.

French Pat. No. 1,421,288 teaches the use of a bromide, optionally with the simultaneous use of a metal salt, as an oxidation catalyst. The reaction takes place in a mixture of an aromatic hydrocarbon and a carboxylic acid.

According to British Pat. No. 1,124,862 the formation of glycol esters is favored by the reaction of an olefin with a nitrate or nitrite in a carboxylic acid using a palladium salt as a catalyst.

According to French Pat. No. 1,419,966, noble metals of Group VIII of the Periodic Table are good catalysts for the oxidation of olefins in, for example, acetic acid. As oxidizing agents in this process, nitric acid salts, or the acid set free from these salts, are employed.

According to U.S. Pat. No. 3,542,857 olefins and molecular oxygen are used in a carboxylic acid to form glycolic acid esters if a cerium salt soluble in the carboxylic acid is employed as a catalyst.

In German Pat. publication No. 1,931,563, iodine or iodide ion together with a cation which is an alkali metal cation, a nitrogenous cation, or a cation of a heavy metal having a periodic number from 21 to 30 or 48 is taught as a favorable catalyst for glycol ester formation from an olefin and oxygen in the simultaneous presence of a carboxylic acid.

The same process is, according to German Pat. publication No. 1,948,787, favorably influenced by catalyst systems comprising bromine or chlorine or a bromine- or chlorine-containing compound on the one hand and, on the other hand, containing a cation of a multivalent metal selected from the group consisting of tellurium, cerium, arsenic, antimony, manganese, or cobalt.

Also, according to German Pat. publication No. 2,126,505 multivalent metal cations, namely tellurium, cerium, antimony, manganese, vanadium, gallium, arsenic, cobalt, copper, selenium, chromium, and silver, in combination with bromine or chlorine or hydrobromic or hydrochloric acid are effective catalysts for the preparation of glycol esters from olefins, oxygen, and a carboxylic acid.

Finally, British Pat. No. 1,058,995 should be mentioned. This patent teaches catalysts favoring the same process and which comprise a palladium-II-salt, an acetate of an alkali metal or alkaline earth metal, of copper, iron, tin, or nickel, and a halide of the metals just mentioned.

The selectivity of the known catalysts and/or the yields achieved by their use are not completely satisfactory. Further, in any catalyst system employing a platinum metal, it is necessary to recover the noble metal from the used catalyst system and to rework it.

It has now been found that certain complex compounds permit the reaction of an olefin with oxygen and a carboxylic acid to form glycol esters with high selectivity and outstanding yields. According to the present invention, the catalysts are formed from a  a compound of titanium and at least one compound of lithium, beryllium, magnesium, calcium, boron, aluminum, silicon, or phosphorus; or b  compounds of at least two elements selected from the group consisting of boron, aluminum, silicon, and phosphorus.

It can be hypothesized that the catalysts of the invention, which comprise compounds of at least two different elements, represent polynuclear complex compounds whose central atoms are the aforementioned elements in the aforementioned combinations. This hypothesis can be supported by the concept of polynuclear complexes of different composition and having a different catalytic effect.

Already in 1904, W. Dilthey described [cf. Chem. Ber. 37, 589 (1904)]polynuclear complexes whose central atoms, for example titanium and iron, are bound by way of chlorine atoms as bridge ligands and which comprise chlorine and acetyl acetonate as further anionic ligands. A catalyst effective in the synthesis of vinyl acetate was formulated by Van Helden [cf. Rec. Trav. Chim. 87, 961 (1968)] as a polynuclear complex of the formula

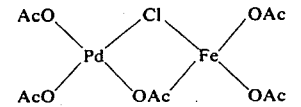

Such complexes can be envisioned as the site of catalytic activity: for example, in the aforementioned synthesis of vinyl acetate, ethylene is temporarily bound as a ligand. Carrying this over to the catalysts which are to be used for olefin oxidation according to the present invention, it can be hypothesized that these have the following structure, shown for a Ti-P complex:

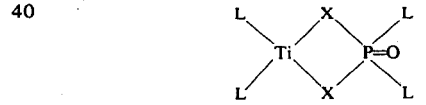

In this formula, X signifies the bridge ligands, which can be halogen or acetate anions. L signifies a ligand, advantageously typified as halogen, acetate, or acetyl acetonate anions.

In the formulation of catalytically-effective polynuclear complexes, the halogens, and particularly fluorine, chlorine, and bromine, play a preferred role in which the promoting effect of bromine is greater than that of chlorine.

The ligands designated as L have great significance for the selectivity of the catalytic complex. The aforementioned ligands, which advantageously are present in the complexes to be used according to the present invention, are those having a very weak ligand field strength.

It is emphasized that these proposals concerning the polynuclear nature of the catalytically effective complex compounds of the invention have not yet been sufficiently proved, but that this concept nevertheless has proved useful in the selection and testing of the catalysts to be employed according to the present invention.

Whereas the elements of the first and second main groups of the Periodic Table, namely lithium, beryllium, magnesium, and calcium, only form complexes having sufficient catalytic activity when in combination with titanium, the elements boron, aluminum, silicon, and phosphorus, belonging to the third to fifth main groups, can form polynuclear complexes which favorably influence olefin oxidation not only with titanium, but also with each other.

The aforementioned German Pat. publication No. 1,931,565 describes the preparation of glycol esters by the reaction of an olefin with oxygen and a carboxylic acid employing catalysts wherein one component is titanium or an alkali metal, scandium, a metal having a periodic number from 23 to 30, or cadmium. The oxidation of the olefin takes place under the influence of iodine, whereas the aforementioned metals, among which is titanium -- used according to the present invention --, merely serve the function of a co-catalyst.

Advantageously, the elements to be used according to the present invention are employed in the form of their halides. The halogen increasing the catalytic effect can also be employed in the form of the halide of another metal, a free hydrohalic acid, or even as elemental halogen introduced into the reaction mixture, provided that the aforementioned catalytic elements are in the form of a compound soluble in the reaction medium, for example as their acetates. It should be mentioned that special corrosion problems arise, particularly in the use of hydrochloric acid, chlorine, or bromine, for example.

On the assumption that the proposed polynuclear structure of the catalytically effective complexes is correct for the catalysts of the present invention, it can be said that the central atoms of the complex nuclei can be bound by halogen or by acetate anions as the bridge ligands. The olefin oxidation can also be carried out in the presence of chelate-forming complex ligands, for example of an enolizable 1,3-dicarbonyl compound such as acetyl acetone, ethyl acetoacetate, or acetonedicarboxylic acid esters: the corresponding anions are present as free ligands.

Catalysts which contain titanium and phosphorus, or aluminum and phosphorus, or aluminum and titanium as the central atoms of the polynuclear compounds, and whose bridge ligands are halogen or acetate anions, and whose free ligands are halogen, acetate, or acetyl acetonate anions have proved particularly advantageous.

Like the aforementioned processes known to those skilled in the art, the process of the present invention also takes place at elevated temperatures, advantageously in a range between 50° and 200°C. However, one can operate at temperatures below or above the aforementioned temperature region if one accepts, on the one hand, a lower reaction velocity or, on the other hand, greater expenditures for equipment.

It is evident that for the achievement of satisfactory conversions or yields, the reaction according to the present invention advantageously proceeds under pressure. In a discontinuous performance of the new process, the minimum pressure to be employed is largely determined by the amount of the olefin to be introduced into the reaction medium under pressure, by the oxygen which is to be added, and as well by the reaction temperature which is to be used. In a continuous performance of the process, it has proved advantageous to permit glycol ester formation to take place in a pressure region between about 10 atmospheres and about 100 atmospheres. If one operates below or above this pressure region, the same observations made above for the choice of temperature are also basically valid.

The amount in which the compounds or mixtures of compounds employed as catalysts are used in the present invention can vary between wide limits. For example, the mol ratio of the sum of the elements present as central atoms in the complexes to the olefin to be oxidized may be from 1:50 to 1:100,000.

Among the olefins to be used in practicing the present invention, ethylene and propylene have heretofore had a preferred position from the point of view of the commercial significance of the products which are formed. However, in principle, the higher olefins can be converted to the corresponding glycol esters in an analogous fashion.

The carboxylic acid which is employed and which is a reactant can be any monocarboxylic acid or dicarboxylic acid which is resistant to oxidation and which is liquid at the reaction temperature. Advantageously the acid is also liquid at lower temperatures of about 40°C. Examples of such acids are acetic acid, propionic acid, butyric acid, pivalic acid, methacrylic acid, cyclohexene-3-carboxylic acid-1 and heptadecane dicarboxylic acid-1,8 or -1,9.

Although the use, as a reaction medium, of a carboxylic acid which takes part in the ester formation represents the most preferred embodiment of the method of the present invention, in special cases an inert solvent, for example benzene, toluene, or xylene, can advantageously also be present. Even the glycol esters formed as the end product can be viewed as such an inert solvent.

The glycol esters which can be prepared according to the invention find wide uses as solvents and plasticizers, as is well known. The glycol esters of higher carboxylic acids play an important role in the surface-active agent industry. Since the hydrolysis of glycol esters is well known to be a simple and smoothly-running reaction, the process of the present invention is also suitable for the preparation of glycols. The hydrolytically removed acid, optionally after concentration, can be returned to the process for ester formation.

The process of the invention can be carried out discontinuously or continuously. Oxygen can be added per se or in the form of air providing that the presence of a comparatively large amount of inert gas can be tolerated.

The following examples, given by way of illustration, describe the practice of the method of invention with complex-like catalysts. The following comments pertain to their preparation.

The compounds forming the complex compounds can be combined in the reaction medium, for example glacial acetic acid. Advantageously, however, the catalysts are prepared by a special procedure, for example as described more in detail in Examples 1–5, in which compounds of the elements apparently forming the central atoms are reacted with the compounds forming the ligands in an anhydrous medium. The medium is advantageously one which does not take part as a ligand in complex formation during the preparation of the catalysts. In this way, the resultant, apparently polynuclear, complex can precipitate in crystalline form and can be isolated by vacuum filtration. In the absence of water or dampness, it is stable to a sufficient degree. The preparation of a complex comprising $TiCl_4$, $FeCl_3$, and acetyl acetone is described in the aforementioned work of W. Dilthey [Chem. Ber. 37, 589 (1904)]. The formula of the complex compound so formed was characterized by Dilthey as $Ti(acac)_3FeCl_4$. The oxidation catalysts of the present invention can be prepared in an analogous fashion.

A further method for the preparation of the catalysts is the formation of a complex compound of one of the pertinent elements and the reaction of this complex with a compound of one of the other elements in question. This type of preparation is described in "Inorganic Syntheses", 2, 119 (1946): titanium tetrachloride is first reacted with acetylacetone to form a titanium complex and, in a second method step, this is converted with iron-III-chloride into a polynuclear complex. The formation of the titanium complex is represented by the authors with the following formula:

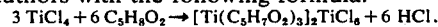
$$3 TiCl_4 + 6 C_5H_8O_2 \rightarrow [Ti(C_5H_7O_2)_3]_2TiCl_6 + 6 HCl.$$

By reaction of the complex just mentioned with $FeCl_3$, the complex $[Ti(C_5H_7O_2)_3]FeCl_4$ is obtained. In analogous fashion, for example by reaction of the aforementioned titanium complex with $AlCl_3$, oxidation catalysts useful according to the present invention can be obtained, the efficacy of which is shown in Example 6.

More in detail, the formation of the catalytically effective complex compounds, whether in a reaction medium or by a special preparatory method, can take place in manifold ways: the elements which represent the central atoms -- to the extent that the concept of a polynuclear structure for the catalysts is correct -- can be used in the form of their halides or other salts of organic and inorganic acids, as oxides, carbonyls, or in the form of organometallic compounds. The organometallic compounds of the elements phosphorus, boron, and silicon are of particular significance. Examples of such compounds are the trialkyl- or triarylphosphites or phosphates, aryl phosphorus halides, boron halides, silicon halides, and the halogeno silanes.

Compounds furnishing ligands can be either the aforementioned compounds themselves or, further, they can be compounds which contain the ligands necessary for the structure of the catalyst. Such compounds include, for example sodium fluoride, potassium acetate, or neutral compounds such as triphenyl phosphine and the already-mentioned compounds such as acetylacetone, ethyl acetoacetate, or acetone dicarboxylic acid esters.

In the examples below, the following technique was used.

In a heatable two-liter autoclave coated with "Teflon," the reaction medium, comprising acetic acid as a solvent and acetic acid anhydride as a water-binding agent, was introduced together with the catalyst. Then the autoclave was closed and the olefin was then introduced into the autoclave under pressure.

When propylene was used, it was introduced under pressure in several steps, because of its low liquefaction pressure of about 10 atmospheres, in order to achieve saturation of the reaction medium. Thereafter, oxygen or compressed air was added and the autoclave was heated to about 140°C.

The contents of the autoclave were worked up by distillation. The reaction products formed were analyzed by gas chromatography and NMR-spectroscopy according to known techniques.

EXAMPLE 1

3 g of acetyl acetone are dissolved in 25 ml of glacial acetic acid and combined first with 1.8 g of boron trichloride and then with 1.9 g of titanium tetrachloride. The yellow-brown solution is stirred for a half hour. 490 ml of glacial acetic acid and 10 ml of acetic anhydride are added to the resultant boron-titanium complex. The reaction solution is introduced into a 2-liter high pressure autoclave, saturated with propylene, then treated with 20 atmospheres of oxygen and heated to a temperature of about 140°C. At this temperature, the reaction is so vigorous that the interior temperature rises within a few minutes to over 190°C. After cooling, the contents are worked up by distillation. 20.6 g of propylene glycol diacetate were produced.

EXAMPLE 2

3 g of acetyl acetone in 25 ml of glacial acetic acid are combined with 2 g of aluminum chloride. 1.1 ml of titanium-IV-chloride are added to the clear yellow solution with stirring. The resultant red precipitate is removed by filtration and washed with a little glacial acetic acid. 5.2 g of the moist complex salt are dissolved in 450 ml of glacial acetic acid and 50 ml of acetic anhydride, introduced into a 2-liter high pressure autoclave, and combined with propylene and oxygen as in Example 1. The mixture is then heated to 140°C. At this temperature, the reaction is so strongly exothermic that the interior temperature rises to over 180°C. After cooling, the contents are worked up by distillation. The following products were found:

35.35 g of 1,2-propanediol diacetate;
1.5 g of 1,2-propanediol monoacetate; and
1.2 g of 1,2-propanediol.

EXAMPLE 3

Proceeding as in Example 1, a complex salt is prepared from 3 g of acetyl acetone, 1.9 g of titanium-IV-chloride, and 1.1 g of calcium chloride in 25 ml of glacial acetic acid. The resultant red precipitate is filtered, dissolved in 450 ml of glacial acetic acid and 10 ml of acetic anhydride, introduced into a 2-liter high pressure autoclave, combined as in Example 1 with propylene and oxygen, and heated to 140°C. After cooling, the contents are distilled. The following were found:

21.4 g of 1,2-propanediol diacetate;
4.7 g of 1,2-propanediol monoacetate; and
1.1 g of 1,2-propanediol.

EXAMPLE 4

A polynuclear complex salt is prepared as in the previous examples from 3.0 g of acetyl acetone, 2.2 g of phosphorus pentachloride, and 1.9 g of titanium-IV-chloride. 2.6 g of the catalyst are dissolved in 450 ml of glacial acetic acid and 50 ml of acetic acid anhydride, combined as in Example 1 with propylene and oxygen, and heated to about 140°C. At this temperature, the reaction is so exothermic that the solution warms itself to 200°C. After cooling, the following are recovered by distillation:

37.6 g of 1,2-propanediol diacetate;
1.22 g of 1,2-propanediol monoacetate; and
0.91 g of 1,2-propanediol.

EXAMPLE 5

3 g of acetyl acetone in 25 ml of glacial acetic acid are combined with 2.1 g of phosphorus pentachloride. To the resultant yellow solution, 1.3 g of aluminum chloride are added and dissolved with warming. The solution now becomes orange colored. After standing for several days, finegrained brownish crystals precipitate. After filtration and washing with a little cold glacial acetic acid, the catalyst is dissolved, as in the previous Examples, in glacial acetic acid and acetic acid anhydride, combined with oxygen and propylene, and the reaction mixture is then heated. At about 145°C. the reaction becomes very strongly exothermic and the temperature rises in a short period of time to over 200°C. Working up gives the following:

27.4 g of 1,2-propanediol diacetate;
0.2 g of 1,2-propanediol monoacetate; and
0.5 g of 1,2-propanediol.

EXAMPLE 6

4.3 g of bis(tri-acetylacetonato-titanium-IV)-hexachlorotitanate-IV, prepared according to Young et al., Inorg. Syn. 2, 119 (1946) are dissolved in 450 ml of a glacial acetic acid and 50 ml of acetic acid anhydride together with 2 g of aluminum trichloride. After saturation with propylene, 20 atmospheres of oxygen are introduced under pressure and the mixture is heated to 152°C. The pressure climbs to 55 atmospheres, then sinks, according to the extent of the reaction, to 15 atmospheres, and then remains constant. When constant pressure is reached, the process is interrupted. Distillation of the autoclave's contents gave 34.3 g of propylene glycol diacetate.

EXAMPLE 7

A polynuclear silicon-titanium complex (tri-acetylacetonato-titanium-IV-penta-chlorosilicate) is prepared in glacial acetic acid from silicon-IV-chloride, titanium-IV-chloride. and acetylacetone according to the method of Dilthey, Chem. Ber. 37, 589 (1904).

Thereafter, 2 g of the isolated complex are dissolved in 450 ml of glacial acetic acid and 50 ml of acetic acid anhydride and treated with propylene and oxygen in the usual way. After the reaction, 12.2 g of propylene glycol diacetate are obtained.

What is claimed is:

1. In a method for making glycol monoesters and glycol diesters of a carboxylic acid by reacting ethylene or propylene with oxygen, in the presence of a catalyst, in a reaction, medium comprising said carboxylic acid, the improvement wherein said catalyst consists essentially of
   a. a complex formed between a compound of titanium and a compound of lithium, beryllium, magnesium, calcium, boron, aluminum, silicon, or phosphorus, or
   b. a complex formed between compounds of at least two elements selected from the group consisting of boron, aluminum, silicon, and phosphorus,
   said complexes containing ligands selected from the group consisting of halogen anions, acetate anions, and enolizable 1,3-dicarbonyl compounds.

2. A method according to claim 1 wherein said carboxylic acid is acetic acid.

3. A method according to claim 1 wherein the catalyst is formed between compounds of titanium and phosphorus.

4. A method according to claim 1 wherein the catalyst is formed between compounds of aluminum and phosphorus.

5. A method according to claim 1 wherein the catalyst is formed between compounds of aluminum and titanium.

6. A method according to claim 1 wherein said complexes contain ligands of an enolizable 1,3-dicarbonyl compound.

* * * * *